United States Patent [19]

Grinde et al.

[11] Patent Number: 4,570,738
[45] Date of Patent: Feb. 18, 1986

[54] SNOW VEHICLE EQUIPPED WITH WIDE, LOW-PRESSURE TIRES

[75] Inventors: James E. Grinde, Anoka; Douglas C. Foote, Coon Rapids, both of Minn.

[73] Assignee: Yamaha Hatsudoki Kabushiki Kaisha, Iwata, Japan

[21] Appl. No.: 688,466

[22] Filed: Jan. 3, 1985

[51] Int. Cl.4 ............................................. B62M 27/02
[52] U.S. Cl. .................................................... 180/196
[58] Field of Search ............... 180/196, 182, 183, 186, 180/189, 194, 195

[56] References Cited

U.S. PATENT DOCUMENTS

| 1,173,883 | 2/1916 | Smith | 180/194 |
| 1,538,633 | 5/1925 | Goodrich | 180/194 X |
| 1,602,924 | 10/1926 | Molitor | 180/194 |
| 1,690,970 | 11/1928 | Ehlert | 180/183 |
| 2,683,608 | 7/1954 | Matheson | 180/183 X |
| 3,542,145 | 11/1970 | Proffer | 180/196 X |
| 3,649,040 | 3/1972 | Snider | 180/196 X |

FOREIGN PATENT DOCUMENTS

| 47470 | 7/1917 | Sweden | 180/183 |
| 194626 | 3/1923 | United Kingdom | 180/183 |

Primary Examiner—John A. Pekar
Attorney, Agent, or Firm—Orrin M. Haugen; Thomas J. Nikolai

[57] ABSTRACT

Disclosed is a vehicle which is constructed to include a pair of steerable right and left front skis suspended from a front portion of a frame. Further included are a pair of right drive wheels and a pair of left drive wheels which are suspended from a rear portion of said frame and adapted to be driven by said engine. Each of the drive wheels has a wide, low-pressure tire. The front ski and rearwardly located driving wheels on each side of the frame are aligned longitudinally to achieve a base having substantially uniform width from front to back.

14 Claims, 11 Drawing Figures

SNOW VEHICLE EQUIPPED WITH WIDE, LOW-PRESSURE TIRES

BACKGROUND OF THE INVENTION

Until recently, the only vehicles suitable for travel off the road over snow covered terrain were traditional snowmobiles of the type having an endless drive track at the rear and one or more steering skis in the front or a so-called "snow cat" which utilizes a plurality of endless tracks without skis. Neither of these types of vehicles, however, is capable of adequate performance over clean, snow-free hard surfaces.

More recently, three-wheeled or four-wheeled vehicles, equipped with wide low-pressure tires having an air pressure of about 0.1 to 0.3 kg/cm$^2$ have been used as both road vehicles and off-the-road vehicles. Although such vehicles are able to run off the road on snow surfaces, the wheels tend to pack and accumulate snow. As a result, the wheels receive high running resistances as they shear the accumulated snow, thus degrading the running performance during off the road runs over snow covered terrain.

The present invention relates to a vehicle which is ideally suited for running both on hard surfaces and on off-the-road snow surfaces. More particularly, the invention is directed to a vehicle which is equipped with wide, low-pressure rear tires and either ski or similar tires on the front yielding improved running performance on soft snow surfaces as well as on hard surfaces.

SUMMARY OF THE INVENTION

A major object of the present invention is to provide a vehicle equipped with wide, low-pressure tires to improve running performance on snow covered surfaces.

Another object of the present invention is to provide a vehicle having wide, low-pressure tires which has improved running performance on hard surfaces as well as snow covered surfaces.

In order to achieve the above-specified objects, the vehicle according to the present invention comprises: an engine mounted on a frame; a pair of right and left steerable front skis suspended from the front portion of the frame; and a pair of right drive wheels and a pair of left drive wheels, said wheels each having wide, low-pressure tires being suspended from rear portions of the frame, and being driven by the engine. The device is built so that the front skis and the rear drive wheels on both sides are aligned in the longitudinal direction of the frame and the width of the device is relatively constant from front to back. As a result, the paired right and left front skis are adapted to be attached to the frame when operating the machine on snow surfaces, but may be removed and replaced with wheels when the machine is operated on firm or paved surfaces.

Various advantages and features of novelty which characterize the invention are pointed out with particularity in the claims annexed hereto and forming a part hereof. However, for a better understanding of the invention, its advantages and objects obtained by its use, reference should be made to the accompanying drawings which form a further part hereof, and to the accompanying descriptive matter, in which there are illustrated and described certain preferred embodiments of the invention.

DESCRIPTION OF THE PREFERRED EMBODIMENT

Figure 1:
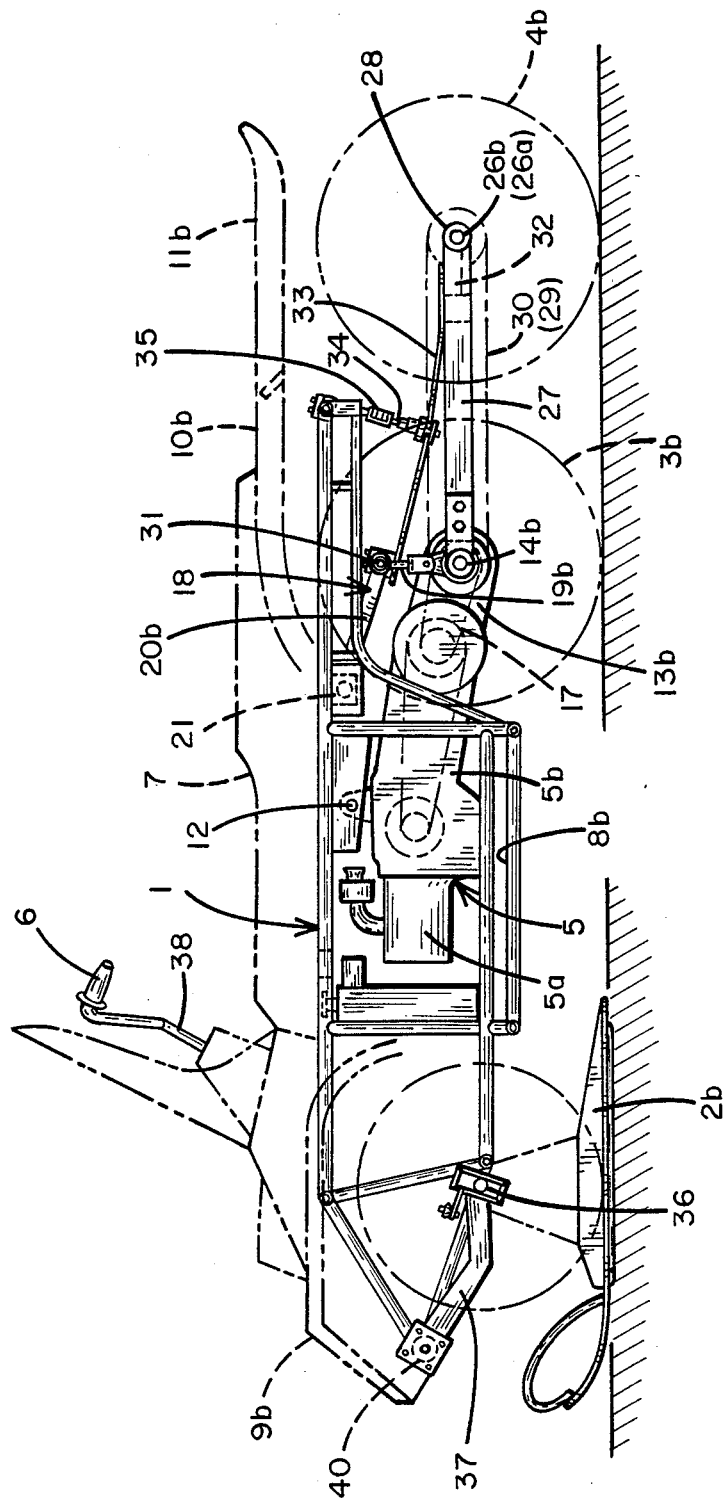
FIG. 1 is a side elevation showing the vehicle of the present invention.

Certain terminology will be used in the following description for convenience and reference only and will not be limiting. The words "upwardly", "downwardly", "rightwardly" and "leftwardly" will refer to directions in the drawings to which reference is made. The words "inwardly" and "outwardly" will refer to directions towards and away from, respectively, the geometric center of the device and associated parts thereof. Said terminology will include the words above specifically mentioned, derivatives thereof, and words of similar import.

Figure 2:
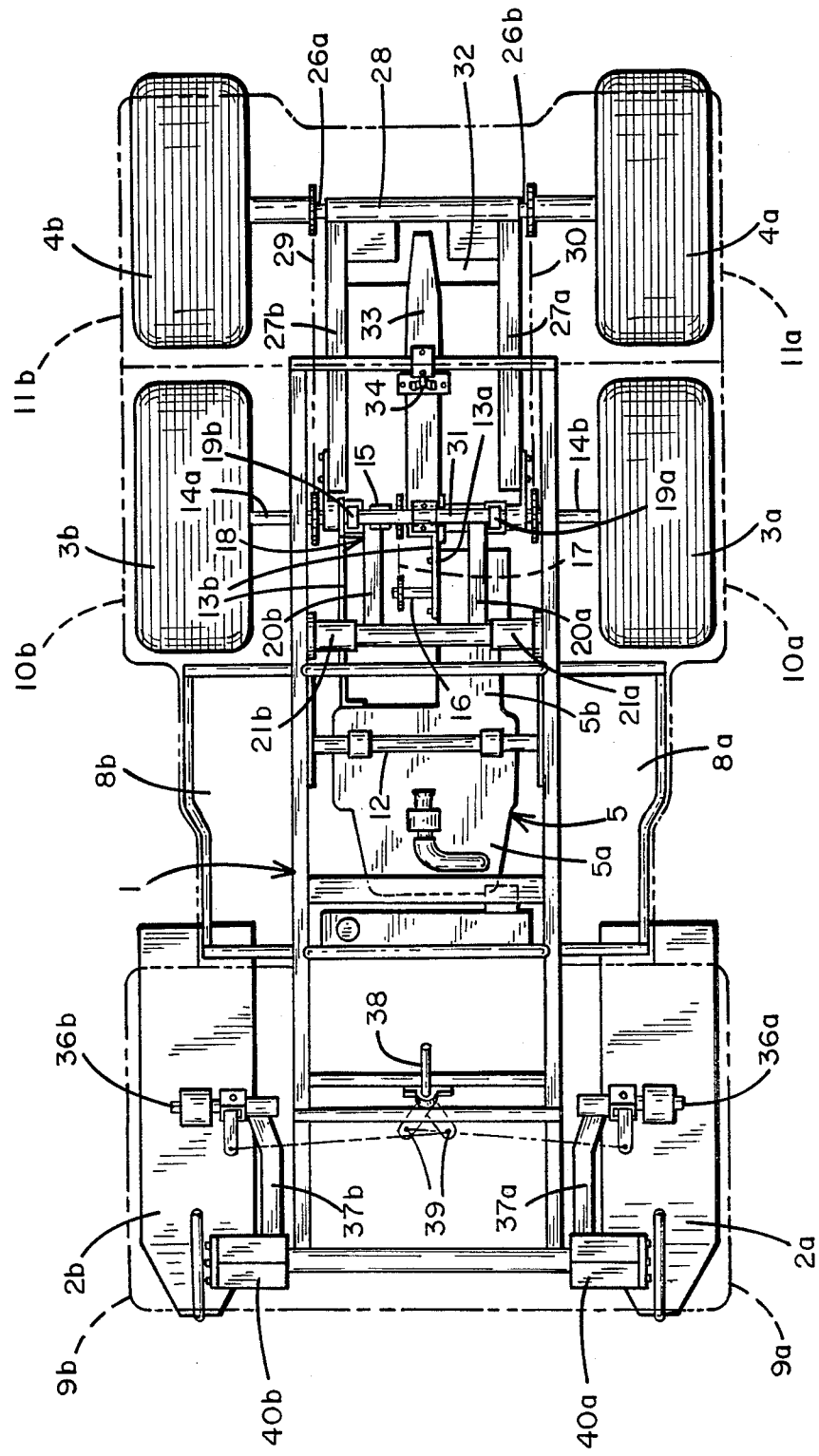
FIG. 2 is a top plan view showing the vehicle.
Figure 3:
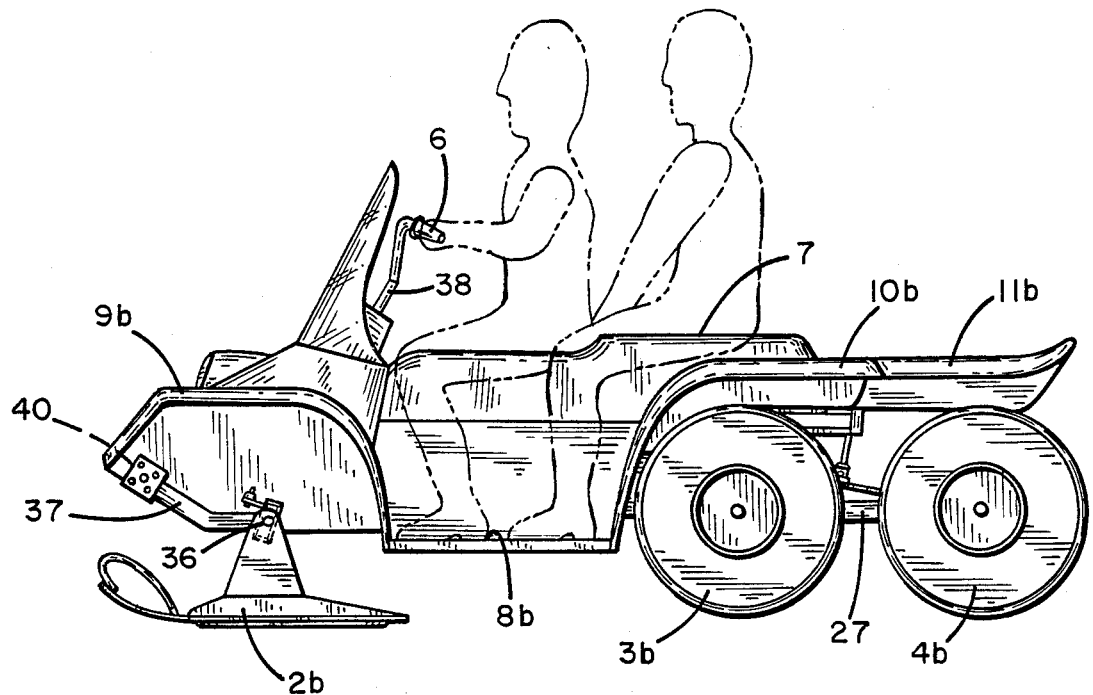
FIG. 3 is a side elevation when the vehicle is rigged for running on snow surfaces.

Referring first to FIGS. 1 through 3, there is shown a longitudinally extending vehicle frame 1. Suspended from respective sides of the front portion of the frame 1 are a right front ski 2a and a left front ski 2b. Suspended from rear portions of frame 1 are a first pair of rear wheels comprised of a right wheel 3a and a left wheel 3b, and a second pair of rear wheels comprised of a right wheel 4a and a left wheel 4b. Each of these wheels are spaced in the longitudinal direction of the frame 1. Front ski 2a and rear wheels 3a and 4a are arranged in a straight line in the longitudinal direction on frame 1. Front ski 2b and rear wheels 3b and 4b are also arranged in a straight line in the longitudinal direction on frame 1. As a result, the width of the vehicle's base is roughly the same from front to back.

Mounted on a middle portion of the aforementioned frame 1 is an engine unit 5. Engine unit 5 is comprised of an engine body 5a located at the front and a transmission portion 5b located at the rear. Above the engine unit 5, there is mounted on the frame a two-passenger seat 7 which extends in the longitudinal direction of the frame. Located on the sides of engine unit 5 and secured to frame 1 are steps or running boards 8a and 8b. A steering handle 6 is also present in front of seat 7.

The aforementioned front skis 2a and 2b are covered with front fenders 9a and 9b, and the rear wheels 3a, 3b, 4a and 4b are covered with rear fenders 10a, 10b, 11a and 11b, respectively. These fenders are constructed so as to be easily removable.

The aforementioned engine unit 5 has its forward end pivotally secured to frame 1 by means of a pivot pin 12. Fixed to the rear portion of the engine unit 5 are a pair of right and left brackets 13a and 13b in which are respectively borne the axles 14a and 14b. Wheel 3a is journaled to the outer end of axle 14a and wheel 3b is likewise journaled to the outer end of axle 14b. The inner ends of axles 14a and 14b are connected to each other by means of a no-spin type differential mechanism 15.

Transversely protruding from the back of transmission 5b is an output shaft 16 which is operative to transmit the engine power to differential 15 through a chain 17. The axles 14a and 14b are operative to transmit the power they receive through the differential mechanism 15 to the wheels.

Figure 5:
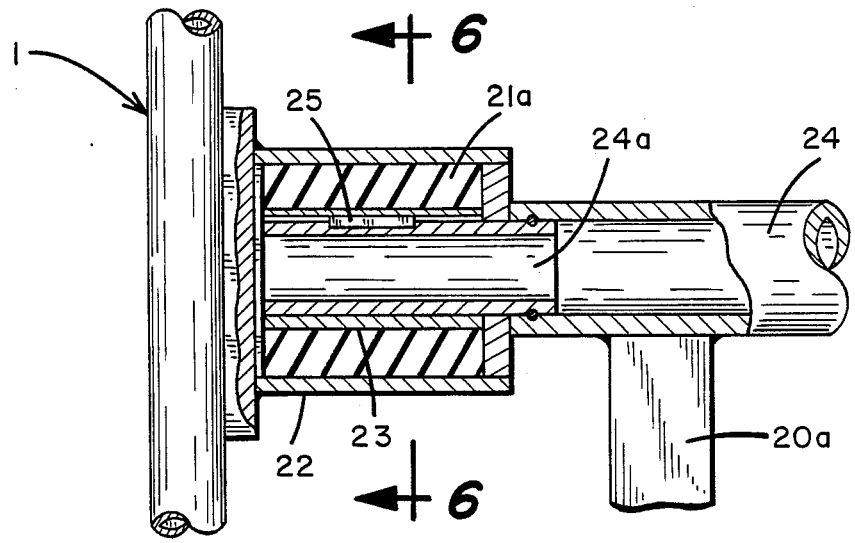
FIG. 5 is a top plan view showing, in partial section, the shock-absorbing unit of the rear wheel suspension mechanism of the vehicle.

Suspended from the frame 1 by shock-absorbing means 18 are brackets 13a and 13b. Shock-absorbing means 18 serve to resiliently support the rear portion of the engine unit 5 and the rear wheels 3a and 3b. Shock-absorbing means 18 is comprised of (1) a pair of right and left lever arms 20a and 20b which have their front ends hinged to the frame 1 through rubber torsion pads 21a and 21b and their rear ends fixing to a hinge pin 31 extending in the transverse direction; and (2) a pair of right and left links 19a and 19b which have their upper ends hinged to the aformentioned hinge pin 31 and their lower ends hinged to the rear ends of brackets 13a and 13b. Rubber torsion pads 21a and 21b, which are best shown in FIG. 5, are retained by an outer square cylinder 22 and an inner circular cylinder 23. Square cylinder 22 is fixed on the frame 1 while circular cylinder 23 is keyed at 25 to the end 24a fixed in a shaft tube 24.

The rear wheels 4a and 4b are secured to axles 26a and 26b which are borne rotatably in bearings 28 at the rear ends of arms 27a and 27b. The front ends of arms 27a and 27b are borne rotatably on axles 14a and 14b. Power is transmitted to axles 26a and 26b from axles 14a and 14b through chains 29 and 30 respectively. As a result, arms 27a and 27b can be detached toegether with the rear wheels 4a and 4b from the frame 1 by simply removing several bolts.

Acting as a load distributor for rear wheels 4a and 4b is a leaf spring 33. Leaf spring 33 has its front end hinged by the hinge pin 31 of the shock-absorbing means 18. The middle portion of leaf spring 33 is pushed down by a rod 34 which is secured at one end to frame 1. The rear end of leaf spring 33 is thus forced to contact with the upper face of a bracket 32 which is fixed to and rides over the rear portions of arms 27a and 27b. Both ends of the aformentioned rod 34 supporting the middle portion of the leaf spring 33 are hinged rotatably. A turnbuckle 35 is also connected to the middle portion of that rod 34 for changing the length of the rod 34 to adjust the contact pressure of the leaf spring 33 with the bracket 32.

Figure 4:
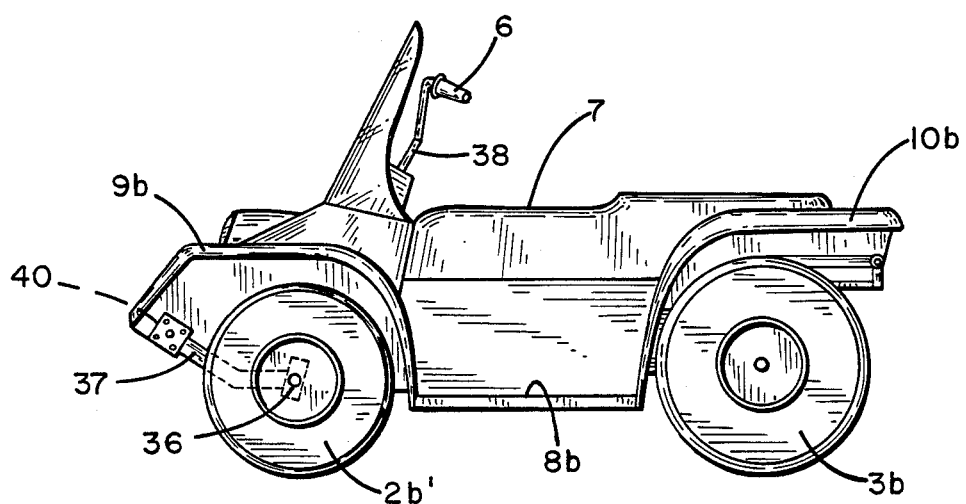
FIG. 4 is a side elevation of the vehicle when rigged for running on paved roads or other firm surfaces.

Front skis 2a and 2b are removably supported on right and left spindles 36a and 36b which are borne on the rear ends of rocking arms 37a and 37b so that they can rotate in a longitudinal direction. Spindles 36a and 36b act also as axles so that front wheels 2a' and 2b' rather than skis 2a and 2b can be attached as shown in FIG. 4. Rocking arms 37a and 37b also have their front ends hinged through rubber torsion pads 40a and 40b to the sides of the front portion of the frame to enable them to rock up and down.

Extending obliquely forward and downward from steering handle 6 is a steering shaft 38. At the lower end of shaft 38 is a mechanism 39 which causes handle 6 and the previously mentioned spindles 36a and 36b to be coactive. As a result, when the handle 6 is operated to the right or left, the front skis 2a and 2b or the front wheels 2a' and 2b' which are supported by the spindles 36a and 36b are steered to the right or left through the steering shaft 38 and the steering mechanism 39.

Figure 6:
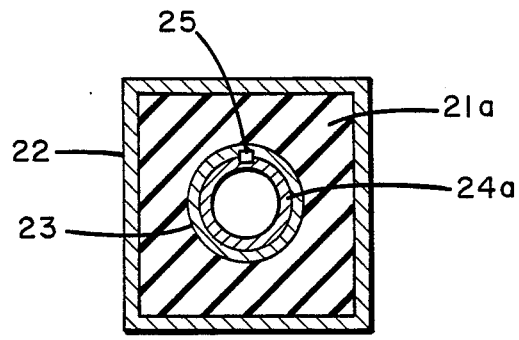
FIG. 6 is a section taken along line VI—VI of FIG. 5.
Figure 7:
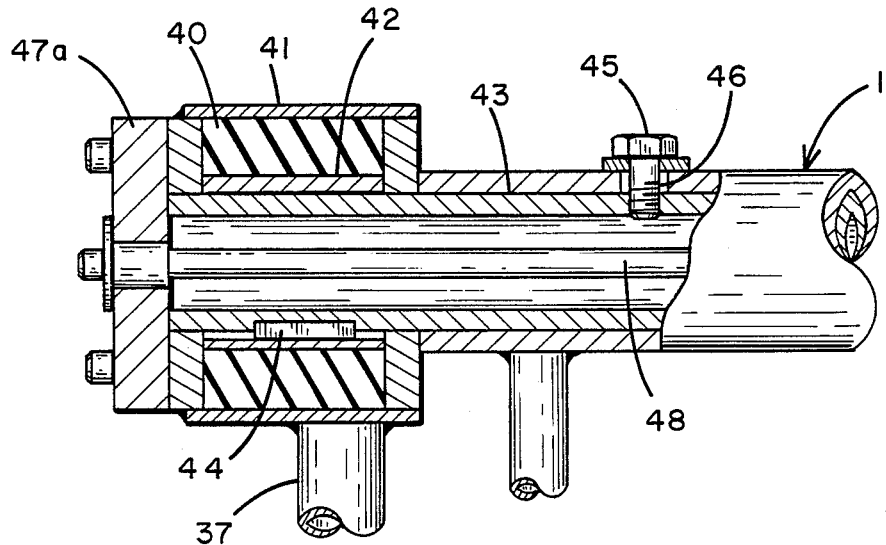
FIG. 7 is a top plan view showing, in partial section, the shock-absorbing unit of a front ski suspension mechanism of the same vehicle.

As shown in FIG. 7, the rubber torsion pad 40 hinging the front end of the rocking arm 37 is fixed in the same fashion as the rear side torsion pad 21 of FIGS. 5 and 6. Square cylinder 41 fits over the outer periphery thereof and a circular cylinder 42 fits within the inner periphery thereof. Square cylinder 41 is welded to the front end of the rocking arm 37, whereas circular cylinder 42 is keyed at 44 to a shaft tube 43 which extends transversely in the frame 1 and which is fixed to the frame 1 by means of a bolt 45. Because this bolt 45 fixes the shaft tube 43 through a slot 46 which is formed to extend in the peripheral direction of the frame 1, the shock-absorbing properties of the torsion pads 40 can be adjusted by changing the position of bolt 45 with respect to slot 46.

Fixed to the outer ends of the aforementioned square cylinder 41 are plates 47a and 47b. Plates 47a and 47b are also fixed to the respective ends of a torsion bar 48 which extends transversely in the shaft tube 43. The torsion bar 48 transmits the forces loaded upon either of the right and left front skis 2a and 2b (or the right and left front wheels 2a' and 2b') from the road surface, as a torsion torque to the other, whereby the vehicle body is prevented from swaying excessively to the right or left.

As has been described above, according to the present invention the paired right and left front skis are disposed at both sides of the front portion of the frame, and the paired right and left driving rear wheels are disposed at the backs of those front skis and arranged straight in the longitudinal direction of the vehicle such that the front skis and the driving rear wheels are made to have substantially the same width. Thus, the skis pack down the snow in front of the rear wheels. As a result, the shears of the accumulated snow by the driving rear wheels is reduced, as is the running resistances on snow surfaces.

Since the paired right and left front skis can be replaceable with front wheels, the vehicle can be used on the paved or other hard surfaces.

Figure 8:
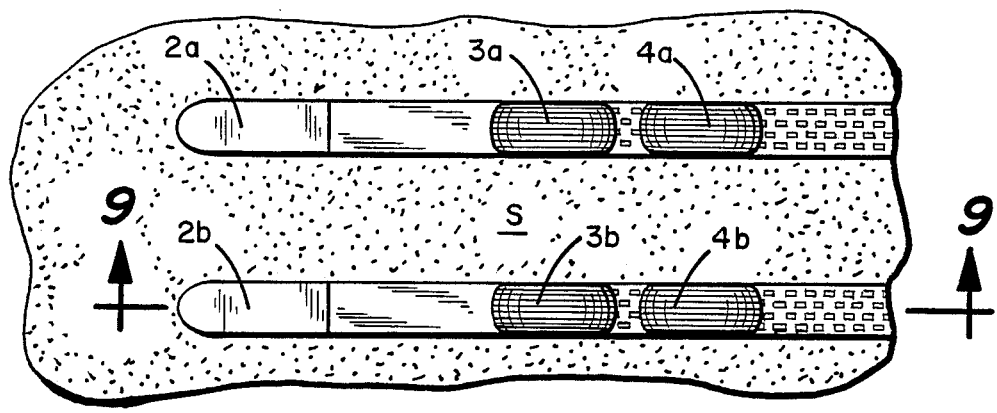
FIG. 8 is a top plan view showing the tracks which are formed on snow surfaces by the front skis and the driving rear wheels when the vehicle of the invention runs on snow surfaces.
Figure 9:
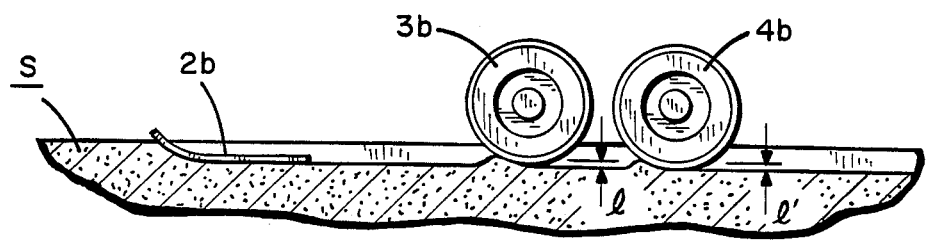
FIG. 9 is a side view section taken along line IX—IX of FIG. 8.

When the vehicle is equipped to run on the snow surfaces, as shown in FIG. 3, the front skis 2a and 2b are supported on the spindles 36a and 36b respectively. Since skis 2a and 2b are rear wheels 3a and 3b, and 3a and 4b are made to have substantially the same width and are arranged straight in the longitudinal direction of the vehicle, when the vehicle runs on a snow surface S, the accompanying rear wheels 3a and 3b run on that portion of the snow surface S which has been packed by the front skis 2a and 2b. See FIGS. 8 and 9. At the same time, the accompanying rear wheels 4a and 4b run on the snow surface S which has been packed by both the skis and the rear wheels 3a and 3b. As a result, the driving rear wheels 3a, 3b, 4a and 4b accumulate less snow that needs to be sheared, thus reducing the running resistance.

Figure 10:
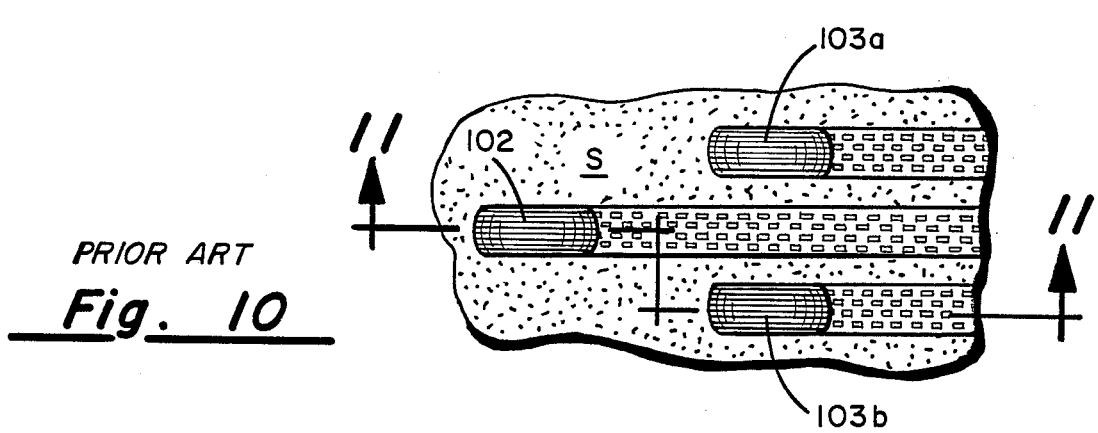
FIG. 10 is a top plan view showing the tracks which are formed on snow surfaces by the front and rear wheels when a conventional three-wheeled motorcycle having the wide, low-pressure tires runs on snow surfaces.
Figure 11:
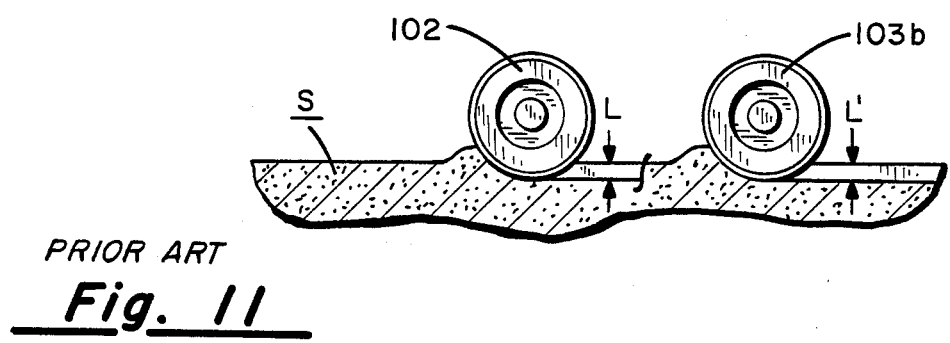
FIG. 11 is a section taken along line XI—XI of FIG. 10.

The present invention has great advantages over the vehicle of the prior art shown in FIGS. 10 and 11. The prior art vehicle's front wheel 102 and rear wheels 103a and 103b pack the snow surface S directly and accumulate large amounts of snow that needs to be sheared. As a result, the front and rear wheels 102 and 103 are subjected to remarkably high running resistances.

When the vehicle of the present invention is equipped to run on the paved roads or other hard surfaces, as shown in FIG. 4, the front skis 2a and 2b are replaced by the front wheels 2a' and 2b'. Further, rear wheels 4a and 4b are removed together with the rear arms 27a and 27b and the rear fenders 11a and 11b. Rear wheels 4a and 4b may be left in place, as shown at the back of FIG. 3, if more traction is required by the terrain.

Numerous characteristics and advantages of the invention have been set forth in the foregoing description, together with details of structure and function of the invention, and novel feature thereof are pointed out in the appended claims. The disclosure, however, is illustrative only, and changes may be made in detail, especially in matters of shape, size and arrangement of parts, within principles of the invention, to the full extent indicated by the broad general meaning of the terms in which the appended claims are expressed.

We claim:

1. In a vehicle of the type comprising an engine mounted on a frame; a transmission integrally joined to said engine; right and left steerable front skis suspended from opposed sides of said frame proximate its front end; and at least one pair of right and left driving rear wheels having relatively low-pressure, wide tires, said driving rear wheels being suspended from axles on both the sides of a rear portion of said frame and adapted to be driven by said engine through a differential mechanism,
the improvement comprising having said front skis and said driving rear wheels of substantially the same width and in alignment in the longitudinal direction of said frame.

2. A vehicle according to claim 1 and further comprising: paired right and left rocking arm means extending in the longitudinal direction of said frame and respectively suspending said paired right and left steerable front skis; and resilient torsion pad hinging one end of said rocking arm means to said frame, said rocking arm means supporting said front skis at its other end.

3. A vehicle according to claim 2, further comprising torsion bar means connecting said paired right and left rocking arms to each other.

4. A vehicle according to claim 1, further comprising shock-absorbing means for supporting from said frame the rear end of said engine and said transmission, said engine being pivotally hinged to said frame, said integrally joined transmission having its rear end suspending said paired right and left driving wheels.

5. A vehicle according to claim 4, wherein said shock-absorbing means includes: lever means having its front hinged to said frame through a resilient torsion pad; and a link having its upper end hinged to the rear end of said lever and its lower end hinged to said integrally joined transmission proximate its rear end thereof.

6. A vehicle according to claim 5 and further comprising: a further pair of right and left rear wheels having substantially the same width as that of said one pair of right and left driving rear wheels, said further pair of right and left rear wheels being aligned with and rearward of said one pair of driving rear wheels, and suspension means for removably suspending said further pair of rear wheels.

7. A vehicle according to claim 6 wherein said suspension means includes: rear arms having their rear ends supporting said further pair of rear wheels and their front ends hinged to said axles of said driving rear wheels; a leaf spring having its front end hinged to said lever of said shock-absorbing means and its rear end forced into contact with the rear portion of said rear arms; and a rod having its upper end hinged to said frame and its lower end hinged to a middle portion of said leaf spring.

8. A vehicle according to claim 7 further comprising a turnbuckle forming a part of said rod.

9. A vehicle according to claim 1, further comprising: a further pair of right and left rear wheels having substantially the same width as that of said one pair of right and left driving rear wheels and journaled for rotation rearward of and longitudinally aligned with said driving rear wheels, and suspension means for removably suspending said further rear wheels from said frame.

10. A vehicle according to claim 9, wherein said further pair of right and left rear wheels are those which are driven by said engine.

11. A vehicle according to claim 10 and further comprising endless chains through which said further pair of right and left rear wheels are driven independently of each other by the axles of said one pair of right and left driving rear wheels.

12. A vehicle according to claim 9 further comprising removable rear fenders disposed above said further rear wheels.

13. A vehicle according to claim 1, wherein said right and left steerable front skis are interchangeable with respective front wheels.

14. A vehicle according to claim 13, further comprising spindles supporting said front skis and acting as the axles for said front wheels.

* * * * *